United States Patent [19]
Kato

[11] Patent Number: 4,845,339
[45] Date of Patent: Jul. 4, 1989

[54] THERMAL HEAD CONTAINING AN INSULATING, HEAT CONDUCTIVE LAYER

[75] Inventor: Masakazu Kato, Furukawa, Japan

[73] Assignee: Alps Electric Co., Ltd., Japan

[21] Appl. No.: 241,783

[22] Filed: Sep. 6, 1988

Related U.S. Application Data

[63] Continuation of Ser. No. 935,319, Nov. 26, 1986, abandoned.

[30] Foreign Application Priority Data

Dec. 25, 1985 [JP] Japan .............................. 60-297082

[51] Int. Cl.[4] .............................. G01D 15/10

[52] U.S. Cl. .............................. 219/216; 219/543; 346/76 PH; 338/308

[58] Field of Search .............................. 219/216 PH, 543; 346/76 PH; 400/120; 338/308, 309

[56] References Cited

U.S. PATENT DOCUMENTS

| | | | |
|---|---|---|---|
| 4,259,564 | 3/1981 | Ohkuba et al. | 219/216 PH |
| 4,343,986 | 8/1982 | Mitani et al. | 219/216 PH |
| 4,574,292 | 3/1986 | Takikawa et al. | 219/216 PH |
| 4,595,822 | 6/1986 | Nishiguchi et al. | 219/216 PH |
| 4,612,433 | 9/1986 | Nagooka et al. | 219/216 PH |
| 4,617,575 | 10/1986 | Fuyama et al. | 346/76 PH |

*Primary Examiner*—A. D. Pellinen
*Assistant Examiner*—Jeffrey A. Gaffin
*Attorney, Agent, or Firm*—Guy W. Shoup; Paul J. Winters; David W. Heid

[57] ABSTRACT

A thermal head in which a glazed layer, an undercoat layer, an electric power supply conductor layer and a protection layer are successively laminated on the surface of an insulating substrate, wherein an insulating heat conductive layer with a good electrical insulating property and high heat conductivity is disposed just below the protection layer. The temperature distribution in the heat generating portion is made uniform to eliminate the heat generation dots destructed with the low electric power applied. In addition, the reliability of the thermal head can significantly be improved, as well as the unevenness in the printing can be eliminated.

2 Claims, 2 Drawing Sheets

FIG. 3(a)
FIG. 3(b)
PRIOR ART
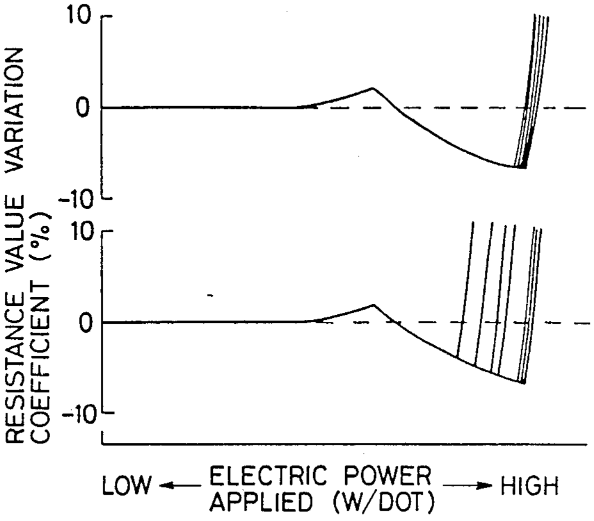
FIG. 4(a)
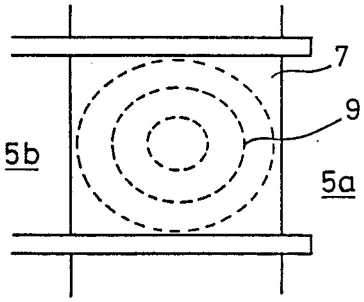
FIG. 4(b)
PRIOR ART
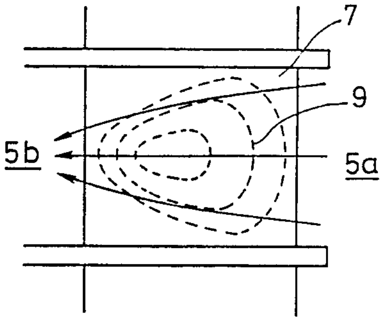

THERMAL HEAD CONTAINING AN INSULATING, HEAT CONDUCTIVE LAYER

This application is a continuation of application Ser. No. 935,319 filed Nov. 26, 1986, now abandoned.

BACKGROUND OF THE INVENTION

1. Field of the Invention

This invention relates to a thermal head for use in a heat sensitive type printer or heat transfer type printer. More particularly, this invention concerns an insulating heat conductive layer disposed just below the protection layer.

2. Description of the Prior Art

The conventional thermal head has a cross sectional structure, for example, as shown in FIG. 2 prepared by using a partially glazed substrate in which a glazed layer 2 is partially formed on the surface of an insulating substrate 1 such as made of alumina and by laminating thereover an undercoat layer 3' such as made of a $Ta_2O_5$ film, a heat generating resistor layer 4 such as made of a $Ta_2N$ or Ta-W-N film, an electric power supply conductor layer 5 such as made of an Al film and a protection layer 6 such as made of a dual layer film composed of a lower $SiO_2$ layer film and an upper $Ta_2O_5$ layer film successively. A part of the heat generating portion 7 generates heat to provide heat energy for developing color on heat sensitive paper (not illustrated) or the like in contact therewith.

The conventional thermal head involves the following problems. FIG. 3(*b*) shows the result of the step-stress test (SST) for the conventional thermal head as described above. In this case, SST is a sort of acceleration tests for evaluating the heat-resistant stability of the thermal head, in which an appropriate pulse voltage is applied for a predetermined length of time to the heat generating resistor body to measure the variation relative to the initial resistance value. The variation coefficient for the resistance value in each of the steps is plotted while gradually increasing the application voltage till the heat generating resistor body is burnt to be disconnected. If the variation coefficient for the resistance value increases in excess of 20%, the heat generating resistor body is judged to be destructed.

Now, FIG. 3(*b*) shows the result of SST for the conventional thermal head having a plurality of heat generating portions (dots). As can be seen from the figure, destruction already appears at a relatively low electric power applied and there is a drawback that the destruction voltage varies depending on the dots. Generation of dots destructed at such a low electric applied power significantly degrades the reliability of the thermal head to result in a significant problem.

SUMMARY OF THE INVENTION

In view of the foregoing problems, the object of the invention is to provide a thermal head of a high reliability not generating dots as destructed by a low electric power applied.

The foregoing object of this invention can be attained by a thermal head in which a glazed layer, an undercoat layer, an electric power supply conductor layer and a protection layer are successively laminated to the surface of an insulating substrate, wherein an insulating heat conductive layer with a good electrical insulating property and high heat conductivity is disposed just below the protection layer.

In this invention, those films selected from silicon nitride, aluminum nitride and boron nitride are preferred as the insulating heat conductive layer.

According to the thermal head of this invention, since the insulating heat conductive layer is disposed, the temperature distribution in the heat generating portion is made more uniform and the heat generating resistor layer and the protection layer as the underlayers can be improved as compared with the conventional thermal head, whereby the formation of dots destructed at low electric power applied can be avoided to thereby significantly improve the reliability of the thermal head.

BRIEF DESCRIPTION OF THE APPENDED DRAWINGS

These and other objects, features, as well as advantageous effects of this invention will now be described more specifically while referring to preferred embodiments illustrated in the appended drawings, wherein FIG. 1 is a cross sectional view for a portion of one embodiment of the thermal head according to this invention;

FIGS. 3(*a*) is a graph showing the result of the step stress test (SST) for the thermal head according to this invention;

FIG. 3(*b*) is a graph showing the result of the SST test for the conventional thermal head;

FIG. 4(*a*) is a plan view for the dot portion of the thermal head according to this invention; and FIG. 4(*b*) is a plan view showing the temperature distribution in the dot portion of the thermal head according to this invention.

DESCRIPTION OF THE PREFERRED EMBODIMENT

Figure 1:
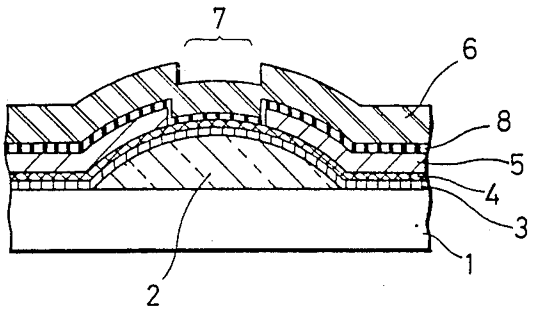
Figure 2:
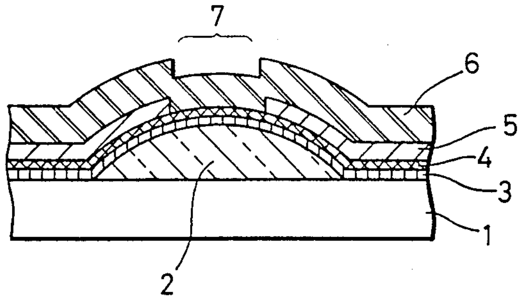
FIG. 2 PRIOR ART
FIG. 2 is a cross sectional view for a portion of a conventional thermal head.

Preferred embodiments of this invention will now be described more specifically referring to FIG. 1.

That is, a partially glazed substrate prepared by partially forming a glaze layer 2 on the surface of an insulating substrate 1 made of alumina is used and an undercoat layer 3 made of $Ta_2O_5$ of about 0.3 $\mu$m thickness, a heat generating resistor layer 4 made of Ta-W-N film of about 0.05 $\mu$m thickness, and an electric power supply conductor layer 5 made of Al film of about 1.5 $\mu$m thickness were successively formed by sputtering. Then, the electric power supply conductor layer 5 and the heat generating resistor layer 4 are patterned into a predetermined configuration by way of photoetching. Then, the insulating heat conductive layer 8 constituting the feature of this invention followed by a protection layer 6 composed of dual-layer film comprising a lower $SiO_2$ layer film (of about 2 $\mu$m thickness) and an upper $Ta_2O_5$ layer film (of about 5 $\mu$m thickness) are successively formed by sputtering.

EXAMPLE 1

The insulating heat conductive layer 8 was constituted with a silicon nitride film of about 0.3 $\mu$m thickness. The silicon nitride film was formed by using a $Si_3N_4$ target by way of RF sputtering. The film-forming conditions included : substrate temperature of about 250° C., sputtering gas of argon with the flow rate of 25 SCCM and RF electric power upon sputtering of 1 KW.

FIG. 3(*a*) shows the result of SST for the thermal head of the present invention. Further, FIG. 3(*b*) shows the result of the test for the conventional thermal head not disposed with the insulating heat conductive layer 8. In this way, as compared with the conventional thermal head, those dots destructed at low electrical power applied were removed in the thermal head of the present invention to attain a high reliability.

EXAMPLE 2

The insulating heat conductive layer 8 was constituted with a silicon nitride film of about 0.3 $\mu$m thickness. The aluminum nitride film was formed by using a A1 target by way of reactive RF sputtering. The film-forming conditions include : substrate temperature of about 250° C., sputtering gas of argon gas with the flow rate of 10 SCCM, nitrogen gas with the flow rate of 10 SCCM and RF electric powr upon sputtering of 1 KW.

The adhesion of the protection layer 6 to the heat generating resistor layer 4 in the heat generating portion 7 was evaluated for the thermal head. In the evaluation method, a diamond presser of a microvickers hard meter was applied to the surface of the protection layer 6 of the heat generating portion 7 under a load of 1 kg for 5 sec and the peeling at the interface between the protection layer 6 and the heat generating resistor layer was observed. Such a test was carried out for a plurality of heat generating portions 7 and it was judged that the adhesion of the protection layer 6 to the heat generating resistor layer 4 is poorer than the adhesion between the heat generating resistor layer, the electrically insulating and heat conductive layer 8, and the protection layer 6 because the protection layer 6 of the conventional method was peeled off at more positions. The results as shown in Table 1 were obtained after conducting the foregoing test for the thermal head of the above-mentioned example of the present invention and for the conventional thermal head without providing the insulating heat conductive layer 8.

TABLE 1

| Sample | Number of heat generating portions tested | Number of protection layers peeled off | Peeling rate |
|---|---|---|---|
| This example | 120 positions | 1 position | 0.8% |
| Conventional Example | 120 positions | 21 positions | 17.5% |

From Table 1, it can be seen that the close bondability between the protection layer 6 and the heat generating resistor layer 4 can significantly be improved in the thermal head of this example of the present invention in which the aluminum nitride film is disposed as the insulating heat conductive layer 8.

The descriptions stated to the foregoing two examples are not restricted to the silicon nitride film and the aluminum nitride film, respectively, but similar effects could also be obtained by using any of silicon nitride film, aluminum nitride film and boron nitride film as the insulating heat conductive layer 8.

Then, when the temperature distribution in the heat generating portion 7 was measured, the temperature distribution which may be attributable to the flow of current was confirmed as shown in FIG. 4(*b*) in the conventional thermal head having no insulating heat conductive layer 8. That is, the figure is a plan view for the heat generating portion 7 in which the curve 9 indicates the equi-temperature line. The current flows from a common electrode 5*a* passing through the heat generating resistor layer of the heat generating portion 7 into respective individual electrodes 5*b*. Since the current flows into the individual electrodes 5*b* while being concentrated near the center as shown by the arrow in the drawing, high temperature portion is localized partially at the portion nearer to the individual electrodes 5*b* of the heat generating portion 7. Accordingly, a portion with an abrupt temperature slope is resulted between the high temperature portion and the end of the individual electrode 5*b*. Then, when the cycles of heating and cooling at msec order are repeated, cracks are developed in the protection layer 6 in the abrupt temperature slope range which significantly oxidize the heat generaring resistor layer and rapidly increase the resistance value.

While on the other hand, when the temperature distribution was measured for the heat generating portion 7 regarding the thermal head according to this invention provided with the insulating heat conductive layer 8, the high temperature portion situated at the central portion has no abrupt temperature slope range as in the conventional embodiment as shown in FIG. 4(*a*). The reason may be explaed as below. That is, Table 2 shows the heat conductivity of $SiO_2$ used in the protection layer 6 and the materials constituting the insulating heat conductive layer 8 in this invention.

TABLE 2

| Material | Heat conductivity (W/m.°C.) |
|---|---|
| $SiO_2$ | 1.6 |
| Silicon nitride | 20.0 |
| aluminum nitride | 16.0 |
| Boron nitride | 9.3 |

As can be seen from Table 2, the heat conductivity of $SiO_2$ is extremely poor and the heat is less diffused in the case where the $SiO_2$ layer is disposed just above the heat generating resistor layer 4 as in the conventional thermal head shown in FIG. 4(*b*).

While on the other hand, since th eheat conductivity of the silicon nitride, aluminum nitride and boron nitride are higher, it is considered that the heat diffusion shown in FIG. 4(*a*) which resulted in the thermal head according to this invention where these films are laminated just above the heat generating resistor layer 4 made the temperature distribution uniform in the heat generating portion 7. Further, there is also derived from the synergistic effect with the high bondability to the heat generating resistor layer 4 as described above.

As can been described above according to this invention, since the insulating heat conductive layer composed of a silicon nitride film, aluminum nitride film, boron nitride film or the like is disposed just beneath the protection layer, the temperature distribution in the heat generating portion is made uniform to prevent the occurrence of abrupt temperature slope range. Accordingly, the frequency of resulting cracks in the protection layer at the interface with the heat generating portion is significantly reduced. The elimination of cracks developing in the protection layer within the heat generating portion, whereby the heat generating dots destructed with the low electric power applied are eliminated to significantly improve the reliability of the thermal head. Further, since the temperature distribution in the heat generating dots is made uniform, unevenness in the printing can be eliminated to improve the printing quality.

What is claimed is:

1. A thermal head in which a glazed layer, an undercoat layer, a heat generating resistor layer, an electric power supply conductor layer and a protection layer are successively laminated on the surface of an insulating substrate; wherein an electrically insulating heat conductive layer, with a good electrical insulating property and high heat conductivity, selected from the group consisting of silicon nitride, boron nitride, or aluminum nitride is disposed just below said protection layer and is in direct contact with said heat generating resistor layer.

2. A thermal head according to claim 1, wherein said protection layer is comprised of $SiO_2$ and $Ta_2O_5$.

* * * * *